(12) United States Patent
Lüders et al.

(10) Patent No.: US 8,499,845 B2
(45) Date of Patent: Aug. 6, 2013

(54) METHOD AND DEVICE FOR CONTROLLING A FIRE-EXTINGUISHING SYSTEM OF THE HIGH-PRESSURE GAS TYPE

(75) Inventors: Bruno Lüders, Bergheim (DE); Gregor Wildermuth, Leverkusen (DE)

(73) Assignee: Total Walther GmbH Feuerschutz und Sicherheit, Cologne (DE)

( * ) Notice: Subject to any disclaimer, the term of this patent is extended or adjusted under 35 U.S.C. 154(b) by 839 days.

(21) Appl. No.: 12/526,529

(22) PCT Filed: Oct. 19, 2007

(86) PCT No.: PCT/EP2007/061217
§ 371 (c)(1),
(2), (4) Date: Dec. 28, 2009

(87) PCT Pub. No.: WO2008/095549
PCT Pub. Date: Aug. 14, 2008

(65) Prior Publication Data
US 2010/0089596 A1 Apr. 15, 2010

(30) Foreign Application Priority Data
Feb. 10, 2007 (DE) .......................... 10 2007 006 665
May 9, 2007 (DE) ..................... 20 2007 006 631 U

(51) Int. Cl.
*A62C 35/00* (2006.01)
(52) U.S. Cl.
USPC ............................................. 169/20; 251/14
(58) Field of Classification Search
USPC .......... 169/20; 251/58, 63.5, 63.6; 137/454.2, 137/454.6
See application file for complete search history.

(56) References Cited

U.S. PATENT DOCUMENTS

| 2,806,481 | A | | 9/1957 | Faust |
| 3,860,073 | A | * | 1/1975 | Willms ............................ 169/20 |
| 4,381,099 | A | * | 4/1983 | Knedlik ........................... 251/14 |
| 5,899,275 | A | | 5/1999 | Okamoto et al. |
| 6,766,829 | B2 | * | 7/2004 | Takeda et al. ................. 137/877 |

FOREIGN PATENT DOCUMENTS

| DE | 4220062 | 1/1994 |
| DE | 20000365 | 5/2001 |
| EP | 1116499 | 7/2001 |
| WO | 2006/110149 | 10/2006 |

OTHER PUBLICATIONS

International Search Report for corresponding application No. PCT/EP2007/061217 completed Jan. 15, 2008.
English translation to the International Preliminary Report on Patentability for PCT/EP2007/061217 dated Oct. 19, 2009.

* cited by examiner

*Primary Examiner* — Len Tran
*Assistant Examiner* — Viet Le
(74) *Attorney, Agent, or Firm* — Perkins Coie LLP

(57) ABSTRACT

The invention relates to a fire-extinguishing system of the high-pressure gas type, in which the gaseous extinguishing agent is stored under high pressure in at least one high-pressure gas bottle (1). The bottle valve operates, with interposition of a container attachment for the extinguishing gas, as a pressure-controlled, reducing and self-regulating control valve (3). By means of a predetermined control pressure which corresponds to the pressure in the extinguishing line system (2), the pressure of the extinguishing gas is reduced from, for example, 150 to 300 bar within the control valve to, for example, 60 bar. This makes it possible to dispense with all the high-pressure components used to date between the bottle valve and the extinguishing line system. Furthermore, a computational software is no longer required.

9 Claims, 5 Drawing Sheets

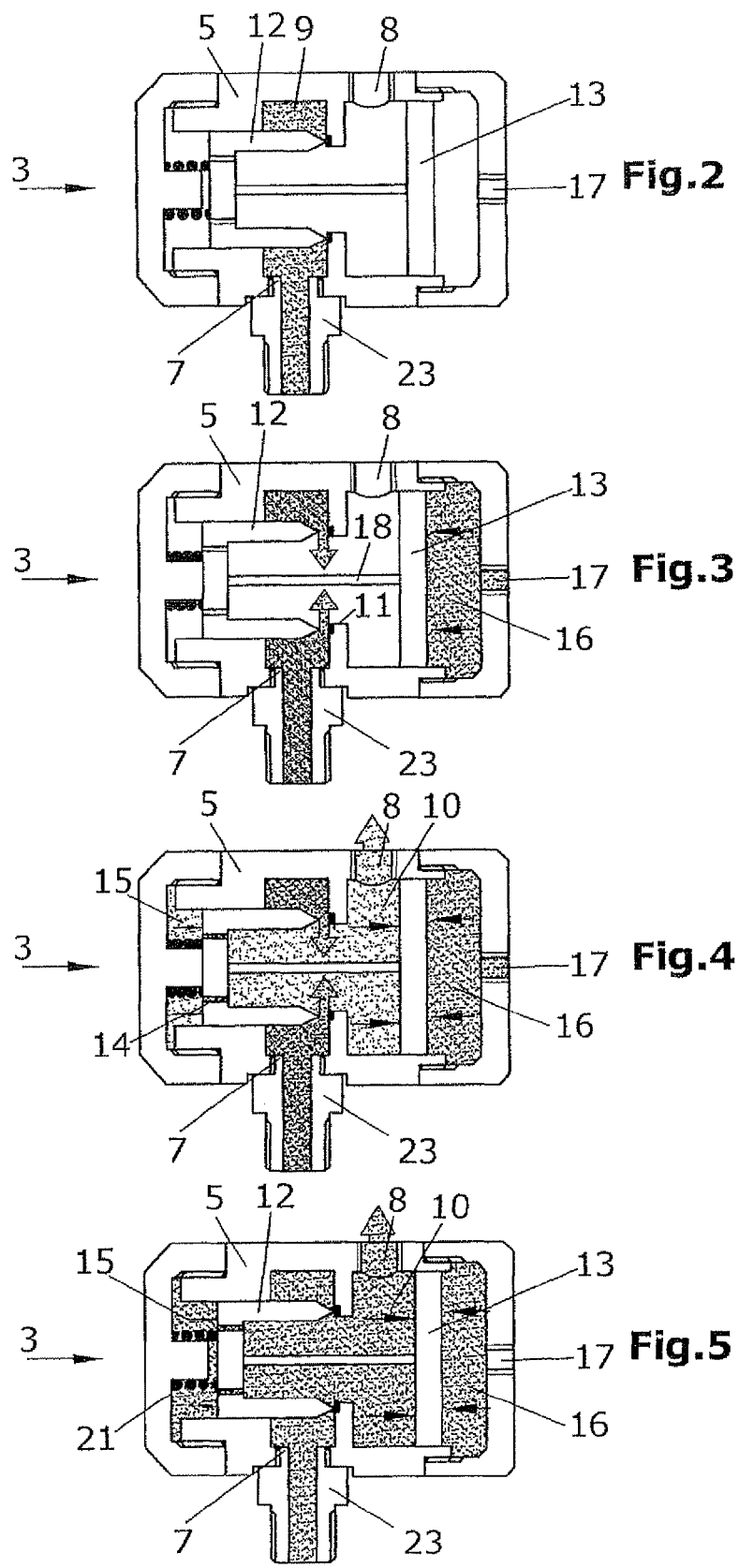

Figure 1:
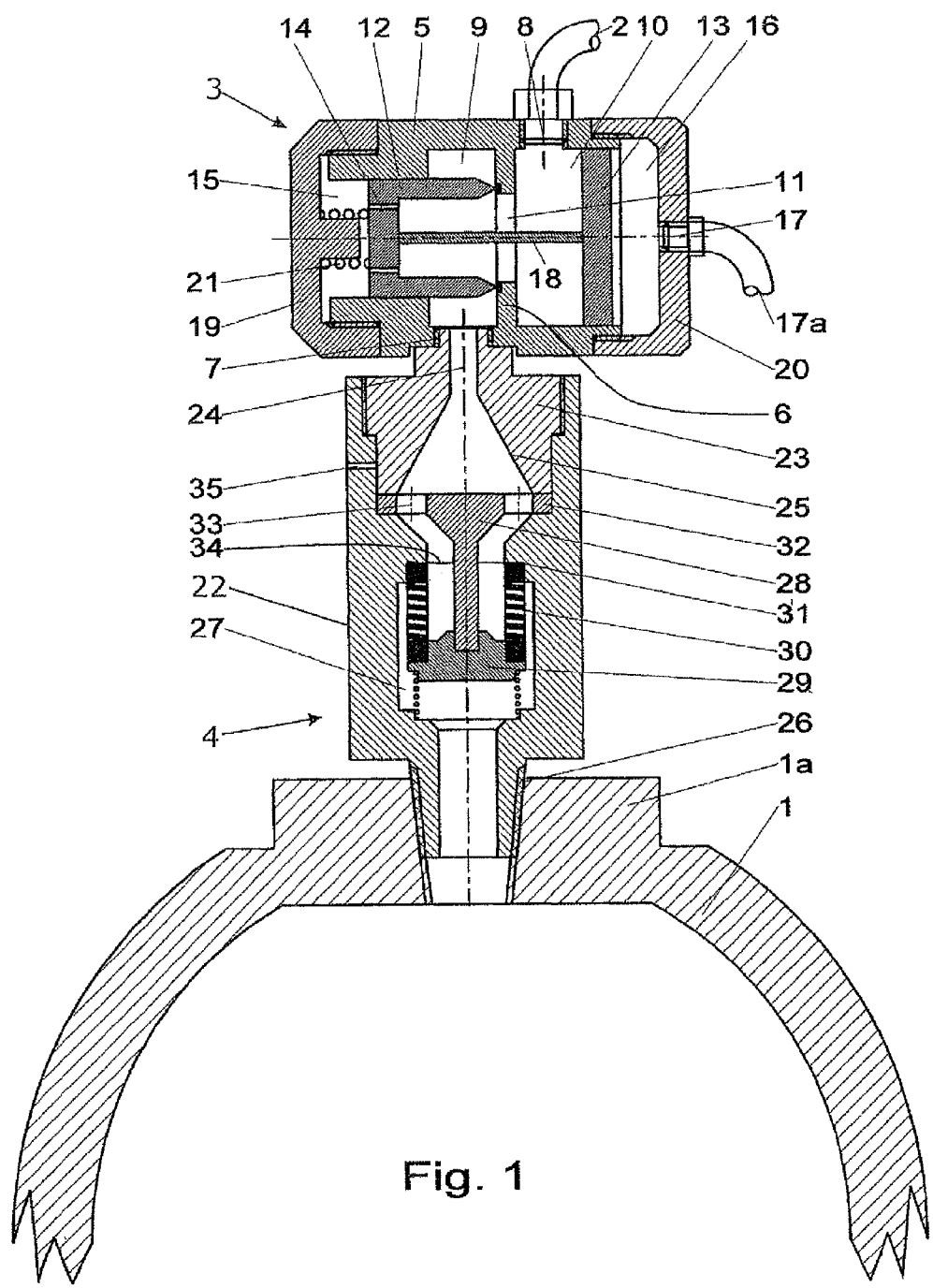

METHOD AND DEVICE FOR CONTROLLING A FIRE-EXTINGUISHING SYSTEM OF THE HIGH-PRESSURE GAS TYPE

The invention relates to a method and a device for controlling the pressure of a fire-extinguishing system of the high-pressure gas type, wherein an extinguishing gas is stored at a high pressure of 150 to 300 bar in at least one compressed gas container, preferably a high-pressure gas bottle with a bottle valve, and the pressure of the extinguishing gas is reduced between the gas bottle and an extinguishing line.

For economic reasons, such fire-extinguishing systems are operated with a fire-extinguishing agent, like argon, argonite, nitrogen, inergen and the like, which is stored under high pressure, as described DE 42 20 062 C1. Here, the extinguishing agent is stored in a compressed form in the high-pressure gas bottles. With these permanent gases, the volume of gas available increases with the pressure applied so that the storage of gases under high pressure is particularly economical.

For an economic operation of fire-extinguishing systems, the pressure of the extinguishing gas leaving the high-pressure gas bottles is reduced before it enters the extinguishing line. It is further known to effect a second pressure reduction (DE 200 00 365 U).

The pressure reduction means used hereinbefore, especially for multiple reduction, can not guarantee—due to the static pressure reduction and insufficient computational software—that the extinguishing gas is introduced into the extinguishing line system at the desired lower pressure. Moreover, the reduction means used up to now are rather material-consuming.

A valve on an extinguishing gas container, to which a control pressure is applied, is described in U.S. Pat. No. 5,899,275. This valve includes a control spool to which a control pressure is applied and which acts on another valve by means of a plunger, which valve closes the outlet of the compressed gas container. The control pressure has to open the other valve against the action of the container pressure. Such a valve structure is useful only for gas bottles with a relatively low pressure, since the control gas pressure has to counteract the bottle pressure.

WO 2006/110149 A1 describes a pressure-controlled extinguishing valve wherein the container pressure acts radially on a truncated piston that is displaceable through the cross section of a passage. Because of the conic shape of the piston, the container pressure exerts an axially directed force component on the piston. Therefore, this device is not suited for high-pressure applications either.

It is an object of the invention to provide a method and a device for controlling a fire-extinguishing system of the high-pressure gas type, in order to guarantee, using the simplest means, that the extinguishing gas enters the extinguishing line at the desired low pressure.

The method according to the invention is defined by claim 1. In accordance therewith, it is provided that a pressure-controlled, reducing and self-regulating control valve is used for pressure reduction, the outlet pressure of the extinguishing gas from the control valve into the extinguishing line is influenced, via a control pressure chamber, by means of a control gas having a predetermined control pressure, so that the outlet pressure of the extinguishing gas is maintained by the control valve itself and that the pressure of the compressed gas container in compensated for in the control valve so that it does not exert a displacing force component on the control piston.

The device of the invention is defined by claim 3. It is characterized in that the control valve is configured such that the high pressure of the pressure gas container exerts no displacing force component on the control piston.

As a result of the compensation of the container pressure force in the control valve, the control piston is displaced only through the control pressure and does not depend on the high pressure. Thus, a very precise regulation of the outlet pressure is possible even if the container pressure is very high with respect to the outlet pressure. Thus, a multi-stage pressure reduction can be omitted.

Due to the pressure reduction valve being configured as a control valve, the known components under high pressure between the bottle valve and the extinguishing line system, such as additional reducing means, together with the required connection elements under high pressure and the high-pressure hoses are avoided. Thus, reducing the extinguishing gas pressure is facilitated. Using the control pressure chamber and the predetermined control pressure, it is achieved that the pressure of the extinguishing gas leaving the control valve and entering the extinguishing line system does not exceed the predetermined control pressure. It is thus guaranteed that no pressure higher than the pressure set can prevail in the extinguishing line system, since this pressure is controlled dynamically within a control valve. Thus, damages caused to the pipeline system by exceedingly high pressure are avoided.

It is another advantage of the invention that the omission of the additional reduction means, the handling during the assembly of the fire-extinguishing system is simplified. Further, computational software for hydraulic pressures ranging from 200 to 300 bar can be dispensed with. This is another particular advantage of the invention, since until today no safe computational software is freely available on the market.

A preferred device is characterized in that, in the vicinity of an inlet opening in the valve housing, a high-pressure chamber is provided and that a working pressure chamber is provided in the vicinity of an outlet opening in the valve housing, which chambers are connected by means of a changeover opening in a partitioning wall, with which a closing piston and a control piston are associated, respectively, wherein a compensation chamber is provided on the rear side of the closing piston provided with a compensation opening and a control pressure chamber with a connector for control gas is provided on the rear side of the control piston, and wherein the closing piston is connected with the control piston via a connecting rod.

A container attachment is provided for the purpose of mounting the control valve, which attachment is fit in between the bottle neck and the control valve. The container attachment comprises a valve socket adapted to be screwed onto the compressed gas container using a bottle nozzle, the valve socket being connected with the control valve via a valve connector threaded into the valve socket bore.

Embodiments of the invention and the operation of the control valve will be explained in more detail with reference to the drawings.

Figure 6:
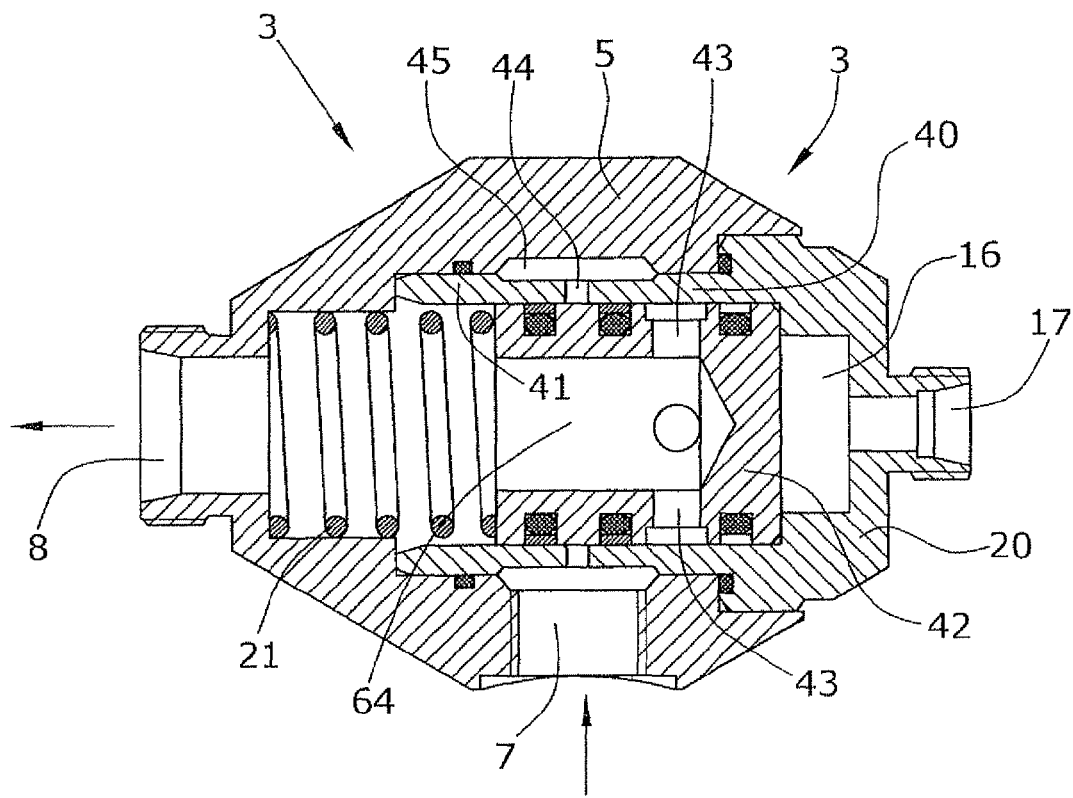
Figure 7:
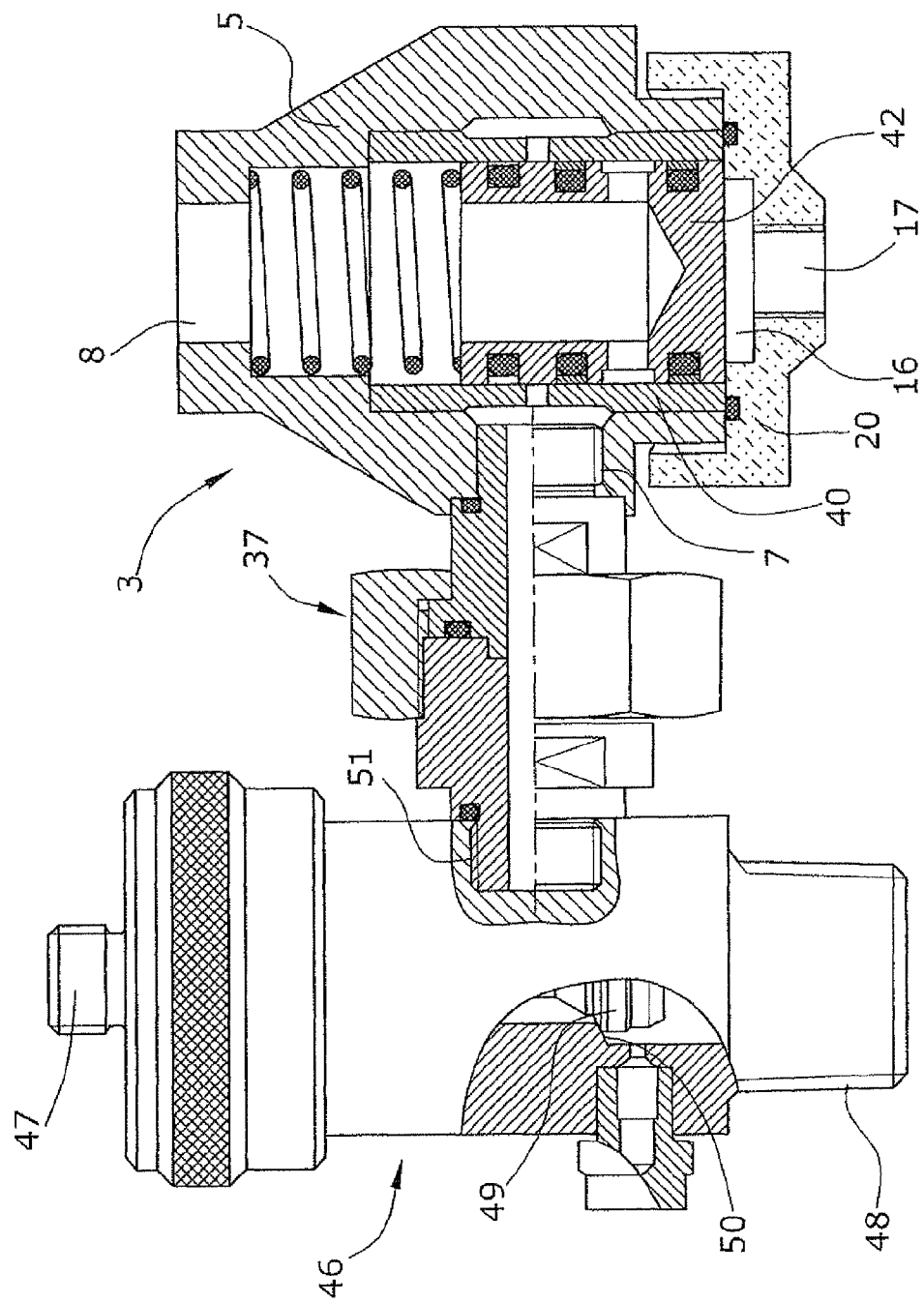
Figure 8:
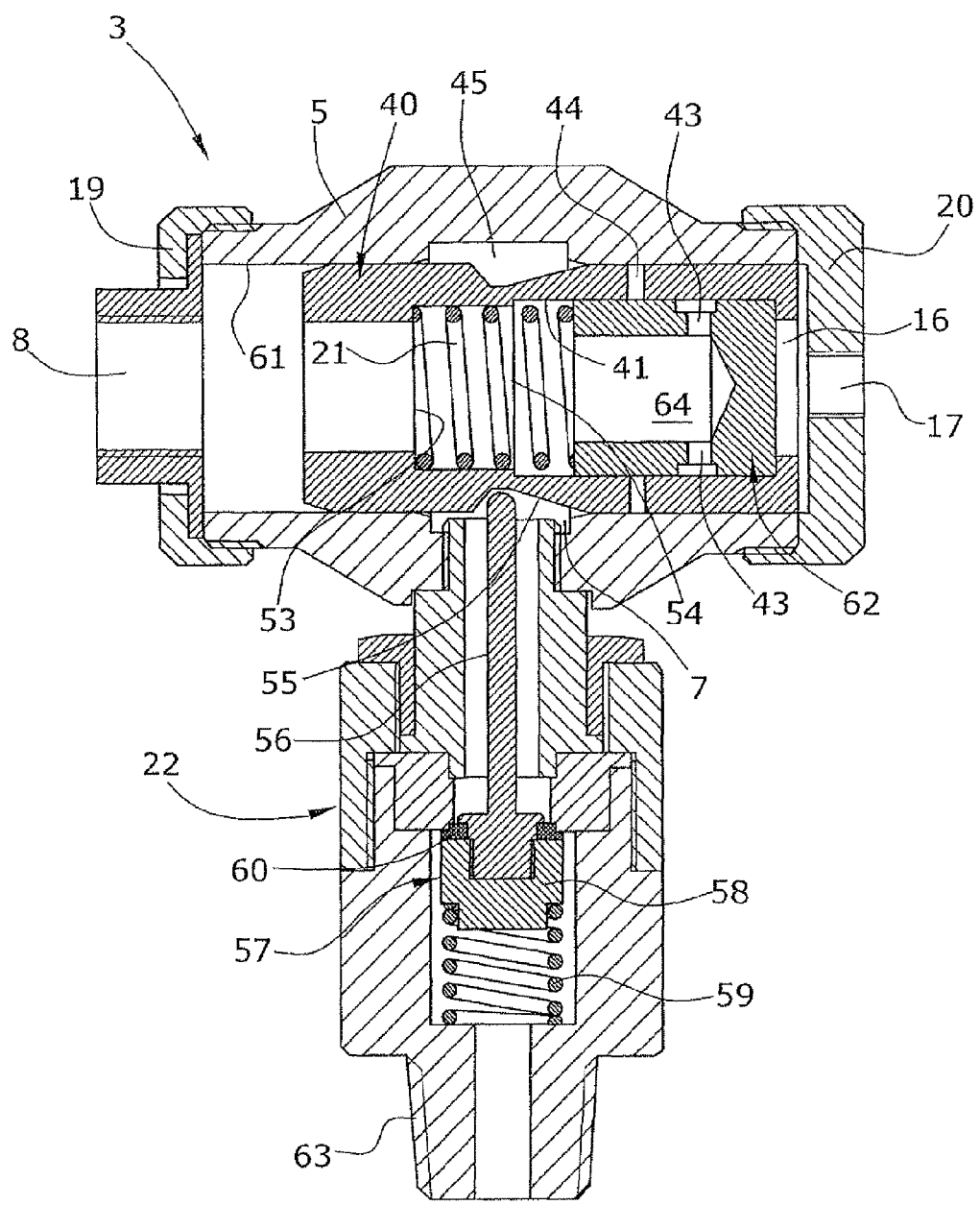

In the Figures:

FIG. 1 is an overall sectional view on a first embodiment of the control valve with the valve socket, FIGS. 2-5 illustrate the individual operational phases of the control valve of FIG. 1, FIG. 6 shows a second embodiment of the control valve, FIG. 7 shows the fitting of the control valve to a container valve, and FIG. 8 illustrates a third embodiment of the control valve that opens a container valve in dependence on the control pressure, so that the high pressure does not continuously act on the control valve.

The control valve 3 of FIGS. 1-5 is formed by a valve housing 5 with a partitioning wall 6 having a changeover opening 11, wherein, on the one side of the partitioning wall 6, an inlet opening 7 for the high-pressure extinguishing gas is provided in the bottom of the control valve 3 and, on the other side of the partitioning wall 6, an outlet opening 8 for the pressure-reduced extinguishing gas is provided in the top of the control valve 3. One side of the valve housing 5 is provided with a cover 19, while the other side of the valve housing 5 is provided with a cover 20. To the right of the partitioning wall 6, a control piston 13 is provided and a closing piston 12 is installed on the left of the partitioning wall 6, both being connected by means of a connecting rod 18. The closing piston 12 is configured such that, depending on its position, it guarantees a pressure-tight closure towards the changeover opening 11 in the partitioning wall 6 or an open condition of the changeover opening 11. The closing piston 12 forms a high-pressure chamber 9 in the region of the inlet opening 7 and forms a compensation chamber 15 on the rear side together with the cover 19, which chamber being connected with the working pressure chamber 10 via a compensation opening 14 in the closing piston 12. Within the compensation chamber 15, a closing spring 21 is mounted. The control piston 13 arranged in the region of the outlet opening 8 forms a control pressure chamber 16 together with the cover 20 and a working pressure chamber 10 together with the partitioning wall 6. The cover 20 is provided with a control pressure connection 17 to which a control pressure line 17*a* for the control gas is connected.

A container attachment 4 is screwed onto the compressed gas container 1, preferably a high-pressure gas bottle, filled with a high-pressure gas at 150 to 300 bar, for instance, which attachment keeps the compressed gas container 1 closed during assembly. The control valve 3 is connected with the container attachment 4. The same is formed by a valve socket 22 with a valve connector fitting 23 set into the upper part thereof and being connected with the inlet opening 7 of the control valve 3. For this purpose, the valve connector fitting 23 has a filling opening 25 flaring downward and a connecting bore 25 above the same. The lower part of the valve socket 22 is configured as a threaded fitting 26 for threading into the container neck is of the compressed gas container 1. In the central portion, the valve socket 22 has a valve socket bore 27 with a ring shoulder 31 surrounding a filling opening 32, on which shoulder a spring seal element 30 is supported in a sealing manner. The valve connector fitting 23 presses against a plunger 28. A valve disk 29 is provided at the lower part of the plunger 28. The spring seal element 30 is biased such that it is permeable to the gas. The spring seal element is compressed by the bottle pressure and thereby seals the filling opening 34.

When the control valve 3 is connected with the container attachment 4, the plunger 28 keeps the filling opening 34 closed by means of the spring seal element 30. When the valve connector fitting 23 is screwed on, a tight connection between the valve connector fitting and the valve socket 22 is made first. The plunger 28 with the spring seal element 30 still keeps the filling opening 34 closed. Upon further threading of the valve connector fitting 23 into the valve socket 22, the valve connector fitting 23 presses against the base plate 32 of the plunger 28 which urges the valve disk towards the compressed gas container 1. Thereby, the spring seal elements 30 are pulled apart so that the high-pressure gas can flow through the open spring seal elements into the high-pressure chamber 9 at its pressure of 150 to 300 bar.

The functioning of the control valve 3 in FIGS. 1-5 will be described in more detail hereinafter.

First, the changeover opening 11 in the partitioning wall 6 is closed by the closing piston 12. The predetermined control pressure of a control gas, e.g. 60 bar, is applied to the control pressure chamber 16 via the control pressure line 17*a*. This pressure can be set optionally and defines the pressure at which the extinguishing gas flows from the outlet opening 8 into the pipe network connected with the extinguishing line 2. The control pressure presses the control piston 13 into the control valve 3. The control piston 13 actuates the closing piston 12 by means of the connection rod 18, whereby the changeover opening 11 and thus the control valve 3 are opened. The gas now flows into the working pressure chamber 10 and through the compensation openings 14 into the compensation chamber 15. From the working pressure chamber 10, the gas flows into the extinguishing line network 2 fills the same and the pressure builds up in the pipe network and in the working pressure chamber 10. When the pressure in the working pressure chamber 10 exceeds the pressure in the control pressure chamber 16, the closing piston 12 and the control piston 13 move in the other direction so that the changeover opening 11 is closed. The closing operation is assisted by the closing spring 21 installed in the compensation chamber 15. Due to the pressure drop occurring in the pipe network and the increasing pressure difference with respect to the control pressure chamber 16, the control piston 13 and the closing piston 12 move rearward so that the changeover opening 11 opens again. This process is continued until the pressure in the compressed gas container 1 is lower than the control pressure. Then, the control valve remains open until the compressed gas container 1 is empty.

With the configuration of the control valve of the present invention, a constant balance is achieved between the working pressure chamber 10 and the control pressure chamber 16 and, as a result, the pressure of the extinguishing gas in the extinguishing line 2 never exceeds the pressure of the control gas.

The modular structure of the control valve 3 and the container attachment 4 with a relief bore 35 allows for a dismounting of the control valve 3 from the container attachment 4 while the compressed gas container 1 is under pressure. Again, this is a further advantage of the invention that is not achieved with known bottle valves.

The control valve 3 of FIG. 6 has a valve housing 5 which at one end comprises the outlet opening 8 in a threaded fitting. From the opposite end, a cylinder bushing 40 with a valve lid 20 is inserted into the valve housing 5. The bushing contains the control pressure connector 17 and the control pressure chamber 16. The cylinder bushing 40 has a cylinder bore 41 in which a piston 42 is arranged for displacement. The piston 42 performs the functions of both the closing piston 12 and control piston 13 of the first embodiment. It includes sealing rings for sealing at the cylinder bore 41. A closing spring 21 supported at the valve housing 5 pushes the piston 42 towards the control pressure connector 17. Thus, the control pressure acts against the closing spring 21.

The piston 42 has a closed front wall defining the control pressure chamber 16. For the rest, it is hollow, open at the rear end and forms the working pressure chamber 64. The piston has transverse bores 43 that may come to coincide with transverse bores 44 of the cylinder bushing 40. The transverse bores 44 are situated in the region of a circumferential groove that is in communication with the inlet opening 7, thereby forming the high-pressure chamber 45. The chamber pressure acts radially on the piston 42 through the transverse bores 44. Thus, no pushing forces are exerted on the piston 42 in the axial direction. The piston 42 is moved only by the control pressure of the control chamber 16 and is influenced by the pressure in the outlet opening 8 or in the extinguishing line 2 (FIG. 1). These pressures act on the piston 42 exclusively in an axial direction.

Using the valve of the invention, the control pressure can be adjusted variably, e.g. between 10 bar and 100 bar. The control pressure always determines the pressure in the extinguishing line 2 leading to the pipe network, regardless of the pressure in the compressed gas container 1.

The pressure in the compressed gas container reaches the annular high-pressure chamber 45 through the inlet opening 7. Through the transverse bores 44, it acts on the piston 43 exclusively in a radial direction without any axial force component. Thus, the high pressure prevailing in the compressed gas container is compensated such that it exerts no displacing force component on the control piston 42. The control piston is thus adjusted only by the control piston in the control pressure chamber 16.

As illustrated in FIG. 7, an adapter 37 is connected to the inlet opening 7 of the valve housing 5. This is a tube coupling with a thread connecting the valve housing 5 with a container valve 46. The container valve 46 is known. The container valve comprises an elongate housing with a connector 47 for the triggering pressure provided at the one end and a connector 48 for threading onto a compressed gas container provided at the opposite end. The container valve includes a piston 49 kept pressed against a seat 50 by means of a spring, thereby closing the passage from the compressed gas container to the outlet 51. By applying a triggering pressure to the connector 47, the piston 49 is moved in order to clear the way for the extinguishing gas under high pressure. The outlet 51 is connected with the adapter 37. The container valve 46 and the control valve 3 form a H-shaped rigid unit together with the adapter 37.

Instead of the triggering pressure applied to the connector 47, the container valve 46 may also be energized mechanically, electrically or hydraulically. The container valve releases the high pressure to the control valve 3. Thus, the control valve 3 is not always exposed to the high pressure, but only if the container valve 46 has opened. From this moment, the piston 42 can exert its pressure regulation function by applying pressure to the control connector 17.

In the embodiment of FIG. 8, the valve housing 5 is mounted on a valve socket 22 screwed to the compressed gas container. The valve housing 5 is closed by the two lids 19 and 20. The lid 20 has the control pressure connector 17 for the control gas and the lid 19 retains a tubular member with the outlet opening 8 therein. The valve housing is provided with a housing bore 61 in which a cylinder bushing 40 is arranged for longitudinal displacement. The cylinder bushing 40 comprises a piston 62 whose front end wall defines the control pressure chamber 16, the piston being displaceable in a cylinder bore 41 of the cylinder bushing. A closing spring 21 pushes the piston 62 towards the control pressure connector 17. The closing spring 21 is supported at a ring shoulder 53 of the cylinder bushing 40. Another ring shoulder serves as an abutment 54 for the piston 62.

The piston 62 is provided with transverse bores 43 that lead into the high-pressure chamber 45 from outside. The transverse bores 43 cooperate with transverse bores 44 in the cylinder bushing 40. When the control pressure has advanced the piston 62 up to the abutment 54 in the cylinder bore 41, the transverse bores 43 and 44 are in communication.

The valve housing 5 includes an annular groove forming the high-pressure chamber 45. When the transverse bores 43 and 44 reach the region of the chamber 45, the container pressure is directed through the transverse bores into the working pressure chamber 64 and from there to the outlet opening 8.

The outer side of the cylinder bushing 40 has a cam contour 55 in the form of a circumferential recess with bevelled flanks. The plunger 56 of a container valve 57 provided in the valve socket plunges into this cam contour. The container valve 57 comprises a valve body 58 pressed against a valve seat 60 by a spring 59. When the end of the plunger 56 is in the depression of the cam contour 55, as illustrated in FIG. 8, the spring 59 pushes the valve body 58 into the closed position. If the piston 62 is displaced by the pressure in the control pressure chamber 16, the transverse bores 43 and 44 come to coincide first, whereafter the cylinder bushing 40 is displaced to the left in FIG. 8. Thus, the tip of the plunger 56 reaches the inclined flank of the cam contour 55. The plunger 56 pushes the valve body 58 into the open position so that the container valve 57 opens and the extinguishing gas, which is under high pressure in the compressed gas container, is released to flow into the control valve 3. The threaded fitting 63 is connected to the compressed gas container.

In the embodiment of FIG. 8, it is also made sure that the high-pressure chamber 45 is not constantly subjected to the high-pressure extinguishing gas. Rather, the high pressure is kept from the control valve 3 by the normally closed container valve 57. The control gas at the control pressure connector 17 effects both the opening of the container valve 57 and the pressure regulation by the control valve 3. Using simple means, the control valve with the valve socket 22 guarantees that the extinguishing gas enters the extinguishing line at the desired lower pressure without the high-pressure chamber being constantly filled with the high-pressure gas.

The invention claimed is:

1. A device for controlling the output pressure of a fire extinguishing system of the high-pressure gas type, comprising:
    at least one compressed gas container: and
    a pressure reduction valve, said pressure reduction valve being a pressure-controlled, self-regulating control valve comprising:
    a valve housing having an inlet opening connected to said one compressed gas container, the valve housing defining an annular high-pressure chamber,
    an outlet opening,
    a cylinder bore; and
    a control piston displaceable in the cylinder bore, the control piston having a side thereof defining a control pressure chamber in which a control pressure is applied such that the control piston is controlled by said control pressure, wherein the control piston is displaceable in the cylinder bore in the valve housing against the action of a spring means and the control piston and the cylinder bore are provided with cooperating passages which, in a defined position of the control piston, communicate with said annular high-pressure chamber and connect the inlet opening with the outlet opening, whereby the control valve is configured such that the high pressure of the compressed gas container exerts no displacing force component on the control piston and a pressure of the gas that flows from the outlet opening is less than said control pressure.

2. The device of claim 1, wherein the control valve is removably fastened to a valve socket which, on the one side, is adapted to be screwed to the compressed gas container by means of a threaded fitting and which, on the other side, is connected to an inlet opening of the control valve by means of a valve connector fitting insertable into a valve socket bore.

3. The device of claim 2, wherein a plunger with a valve disk is mounted in a valve socket bore of said valve socket, which plunger is displaceable by insertion of the valve connector fitting, and that the plunger is surrounded by a spring seal element between the valve disk and a ring shoulder of the valve socket.

4. The device of claim 1, wherein the cylinder bore is a part of a cylinder bushing included in the valve housing.

5. The device of claim 1, wherein the valve housing is fastened to an adapter by its inlet opening, which adapter is in turn fastened to a container valve, the container valve comprising an opening mechanism supplying the pressure of the compressed gas container to the adapter in response to a triggering pressure.

6. The device of claim 4, wherein the cylinder bushing is displaceable within the valve housing and has a cam contour that opens a container valve in dependence on the displacement position of the cylinder bushing.

7. The device of claim 6, wherein the spring means pressing against the control piston is supported at the cylinder bushing.

8. The device of claim 6, wherein the control piston abuts against an abutment of the cylinder bushing and takes the same along.

9. The device of claim 7, wherein the control piston abuts against an abutment of the cylinder bushing and takes the same along.

\* \* \* \* \*